Patented Apr. 17, 1934

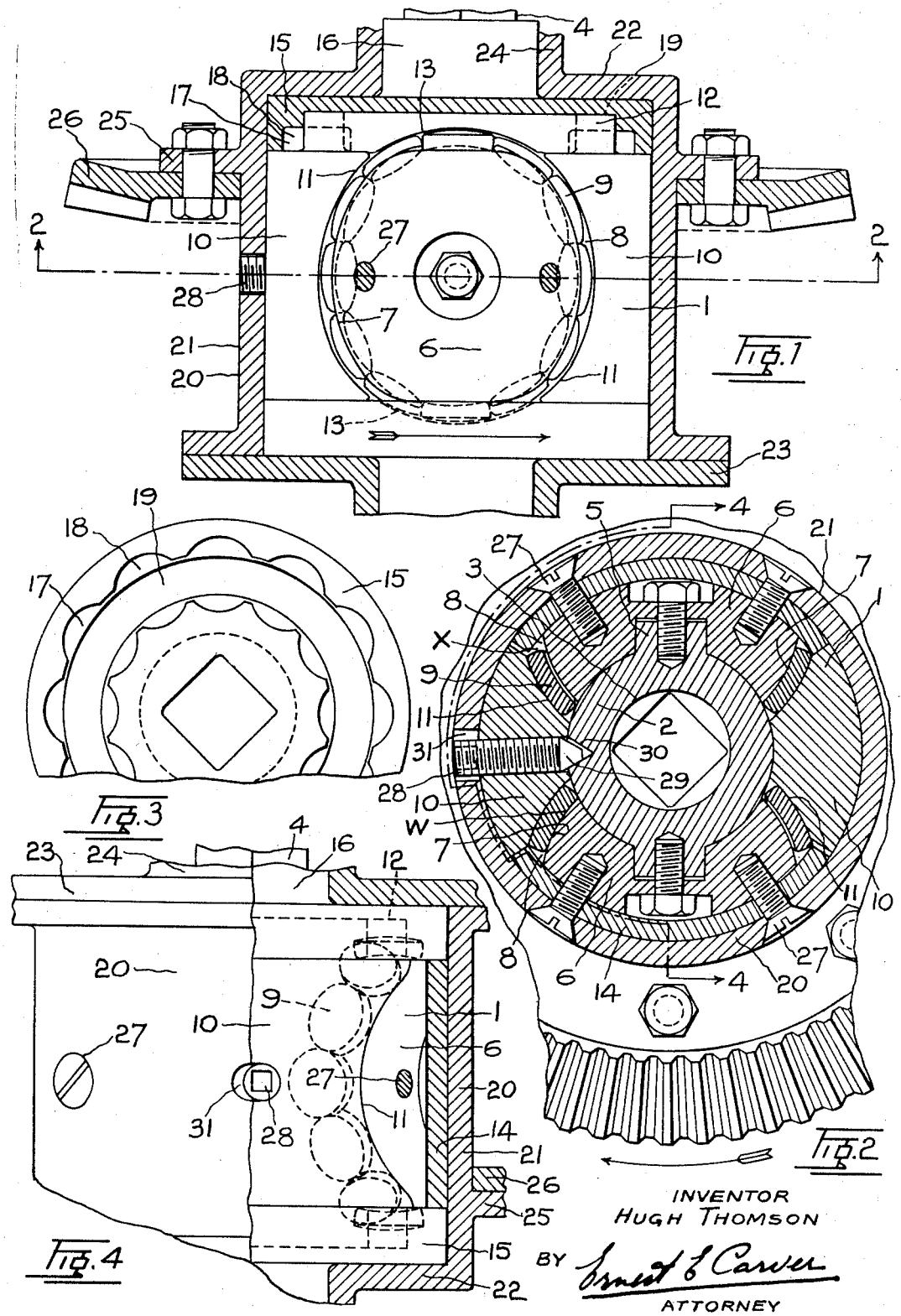

1,955,208

UNITED STATES PATENT OFFICE 1,955,208

GEARLESS DIFFERENTIAL

Hugh Thomson, Burnaby, British Columbia, Canada

Application June 10, 1933, Serial No. 675,230

5 Claims. (Cl. 74—7)

My invention relates to improvements in gearless differentials, which are particularly adapted for use in motor vehicles. The objects of the invention are to provide means whereby the drive from the propeller shaft is communicated to each of the axles according to their needs; to provide means for locking the differential action in the event of one driving wheel losing its traction and momentum; and to provide means whereby the locking effect can be rendered inoperative at will for the purpose of adjusting the brakes of each driving wheel.

The invention consists essentially of a differential housing enclosing two axle discs between which is disposed a drive member or rotor having a spherical track about which a plurality of elements are disposed, and which are capable of movement about said track, and into and out of driving engagement, and means for impeding the movement of said elements about the track, as will be more fully described in the following specification and shown in the accompanying drawing, in which:—

Fig. 1 is a plan view of the invention taken in section through the differential housing and showing the rotor in elevation.

Fig. 2 is a sectional view taken on the line 2—2 of Figure 1.

Fig. 3 is a view showing the inner face of one of the axle discs.

Fig. 4 is a plan view taken on the line 4—4 of Figure 2.

In the drawing like characters of reference indicate corresponding parts in each figure.

The numeral 1 indicates generally the rotor of the differential which is for convenience of manufacture made up with a central core 2 longitudinally bored as at 3 to receive the ends of the axles 4 and the usual thrust washer, not shown. On each side of the core 2 is a boss 5 to which curved blocks 6 are secured, the edge 7 of each block is spherical and forms one side of a track 8 for a plurality of discs 9.

Mounted upon the core 2 are two segments generally indicated by the numeral 10 whose edges 11 form the opposite sides of the tracks 8 about the two blocks 6. These segments are connected together by a pair of annular rings 12 each of which is cut away as at 13 to complete the outer sides of the tracks 8 beyond the length of the core 2.

The blocks 6 are covered with arcuate keeper plates 14 which extend beyond their spherical peripheries and serve to retain the discs 9 in position within their tracks 8.

Mounted upon each end of the core 2 and the segments 10 are axle discs 15 having central bosses 16 upon which they are journalled. The bosses are suitably broached concentrically to receive the squared ends of the axles 4. Formed concentrically in the inner face of each axle disc 15 is a recess 17, divided into a plurality of connected pockets 18 each being capable of receiving a disc 9, and below these pockets annular recesses 19 are formed for the purpose of journalling the rings 12 which connect the segments 10 together. The parts heretofore enumerated are enclosed in a housing 20 having side walls 21, an end wall 22 and a cover 23, the end wall 22 and cover 23 being provided with a boss 24 which is journalled in suitable non-friction bearings, not shown, in the axle housing and which in turn form bearings for the bosses 16 of the axle discs 15.

A flange 25 is provided upon the side walls 21 of the housing 20 to which is secured a suitable crown gear 26.

As previously stated, the segments 10 are freely mounted upon the core 2 and provision is made for an amount of slack, so that a slight movement of said segments can take place about the core, so that when the drive is transmitted through the housing 20 and its connecting screws 27 to the blocks 6 and the core 2 the leading edges of the blocks 6 will be in firm contact with the discs 9 adjacent thereto as at W, see Figure 2, and said discs will be in firm contact with the trailing edges of the segments 10. Conversely between the trailing edges of the blocks 6 and the leading edges of the segments 10 the tracks 8 will be slightly widened as at X. Of the series of discs 9 in each track 8 at least one will always be carried in a pocket 18 in each of the axle discs 15, consequently the rotation of the rotor 1 must impart rotation through the discs 9 in equal proportion to both axle discs 15 provided the resistance to their rotation is equal. If, however, the vehicle to which the device is fitted is travelling around a curve the over-running of the outer wheel and its axles will permit of progressive transfer of discs 9 from the pockets of the outer axle disc 15 half way around the path 8 and to the pockets of the inner axle disc, the drive from the rotor being divided between both the axle discs according to the work they have to do in turning their respective wheels. If one wheel should be so placed as to be unable to get traction, the impedance to movement of the discs 9 about their tracks 8 and the force from the rotor through those discs which are lying in the half of the tracks 8 being applied in equal force to both axle discs 15, both wheels will be rotated at equal speed, so that the wheel which has traction will receive all the power of the drive and will move the vehicle until traction is restored to the other wheel and the normal differential drive will be resumed.

In order that the brakes of the car may be conveniently adjusted, locking means must be provided between the segments 10 and the blocks 6, one such means being the provision of a set screw 28 having a conical inner end 29 which is adapted on being screwed in to its innermost position to tighten within a conical recess 30, the outer end of the set screw being accessible for turning through an opening 31 of such size as to permit of the slack movement of the rotor parts. When the set screw 28 is in its innermost position the track portions W and X are both maintained at exactly the same width, hence the drive applied to the rotor cannot produce any gripping of the discs 9 or retarding action in their movement along their tracks, and in consequence, if one wheel is held immovable the opposite wheel will travel at twice rotor speed in exactly the same manner as in the conventional type of differential and the discs 9 will follow each other about their orbits around the blocks 6, passing progressively from one axle disc to the other in exactly the same cycle as the teeth of the mitre pinions engaging the mitre gears of the said conventional differential. Following brake adjustment, the set screw 28 is sufficiently withdrawn from its recess 30 to permit the segments 10 to float again about the core 2, when the differential resumes its locking function in the event of one of the driving wheels losing its traction.

What I claim as my invention is:

1. A locking differential gear comprising a rotor adapted to be rotated from a source of supply, an axle disc at each end of the rotor, said rotor having an endless path communicating with both discs, a plurality of members adapted to transmit the drive from the rotor to both discs and to be transferred from one disc through said path to the other when driving one disc faster than the other, and means carried by said rotor for impeding the passage of said members along the path.

2. A locking differential gear comprising a rotor adapted to be rotated from a source of supply, an axle disc at each end of the rotor, said rotor having an endless path communicating with both discs, a plurality of members adapted to transmit the drive from the rotor to both discs and to be transferred from one disc through said path to the other when driving one disc faster than the other, and means carried by said rotor for impeding the passage of said members along the path, said means being actuated in response to the drive imparted to the rotor.

3. A locking differential gear comprising a rotor adapted to be rotated from a source of supply, an axle disc at each end of the rotor, said rotor having an endless path communicating with both discs, a plurality of members adapted to transmit the drive from the rotor to both discs, said discs being provided with concentrically arranged pockets each capable of receiving one of said members, said members adapted to be transferred from one disc through said path to the other when one disc is being driven faster than the other, and means carried by said rotor for impeding the passage of said members along the path.

4. A locking differential gear comprising a rotor adapted to be rotated from a source of power, an axle disc at each end of the rotor, pockets concentrically arranged in said discs, said rotor having an endless path intersecting the pockets of each of the discs and a plurality of power transmitting elements filling the path, said rotor having a core carrying in fixed relation thereto one side wall to the path and carrying in floating relation thereto the other side wall to said path.

5. A locking differential gear comprising a rotor adapted to be rotated from a source of power, an axle disc at each end of the rotor, pockets concentrically arranged in said discs, said rotor having an endless path intersecting the pockets of each of the discs and a plurality of power transmitting elements filling the path, said rotor having a core carrying in fixed relation thereto one side wall to the path and carrying in floating relation thereto the other side wall to said path, and means for locking the floating side wall against movement about the core.

HUGH THOMSON.